United States Patent [19]

Kim

[11] Patent Number: 5,657,092
[45] Date of Patent: Aug. 12, 1997

[54] HDTV SYSTEM HAVING PICTURE-IN-PICTURE FUNCTION

[75] Inventor: Jin-Gyeong Kim, Seoul, Rep. of Korea

[73] Assignee: LG Electronics Inc., Seoul, Rep. of Korea

[21] Appl. No.: 555,713

[22] Filed: Nov. 14, 1995

[30] Foreign Application Priority Data

Nov. 15, 1994 [KR] Rep. of Korea ................ 29889/94

[51] Int. Cl.⁶ ............................................. H04N 5/45
[52] U.S. Cl. ...................... 348/565; 348/566; 348/567
[58] Field of Search ...................................... 348/563, 564,
348/565, 566, 568, 567, 584, 586, 588;
H04N 5/445, 5/45, 9/74

[56] References Cited

U.S. PATENT DOCUMENTS 4,827,343 5/1989 Naimpally ............................. 348/565
4,965,669 10/1990 Canfield ................................ 348/588

Primary Examiner—Sherrie Hsia
Attorney, Agent, or Firm—Fish & Richardson P.C.

[57] ABSTRACT

A HDTV system having a PIP function for implementing a PIP image by reconstructing an intraframe image with low resolution, includes a first tuner & channel decoder for receiving a video signal for a PIP via an antenna, a first depacketizer for receiving a signal generated in the first tuning & channel decoder and separating and outputting the same, a second tuning & channel decoder for receiving a video signal for a main screen via an antenna, a second depacketizer for receiving a signal generated in the second tuner & channel decoder and separating and outputting the same, a PIP decoder for receiving the video bit stream of the first depacketizer to reconstruct only the intraframe into a PIP image, a main video decoder for receiving the video bit stream of the second depacketizer and outputting a main image, a multiplexer for multiplexing the outputs of the PIP decoder and the main image decoder, and a VDP portion for receiving the output of the multiplexer and converting the luminance and chrominance signal into R, G and B signals to then be displayed. Therefore, the circuit is simplified owing to the adoption of fewer memories than a main video decoder and the cost is reduced.

8 Claims, 4 Drawing Sheets

FIG.4
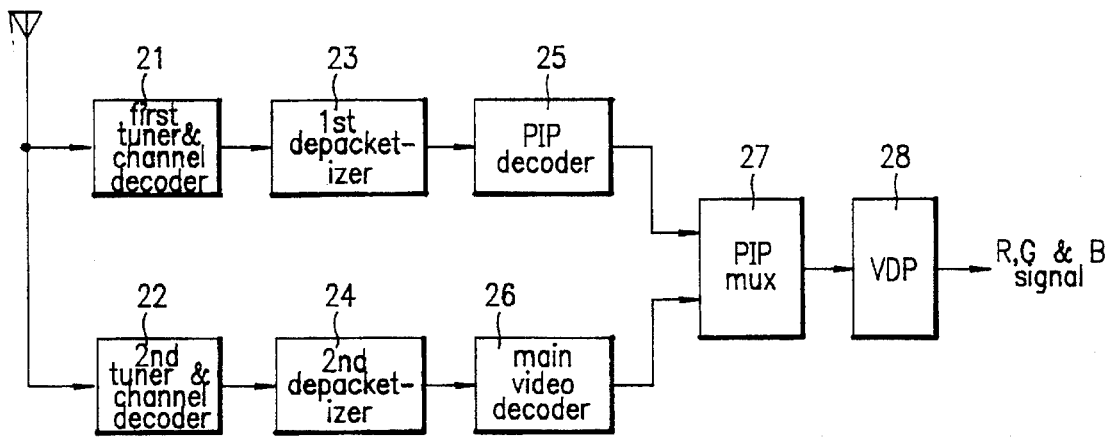
FIG.5
| 0 | 2 | 3 | 9 | 10 | | | |
|---|---|---|---|---|---|---|---|
| 1 | 4 | 8 | 11 | | | | |
| 5 | 7 | 12 | | | | | |
| 6 | 13 | 17 | | | | | |
| 14 | 16 | | | | | | |
| 15 | | | | | | | |
| | | | | | | | 62 |
| | | | | | | 61 | 63 |
FIG.6
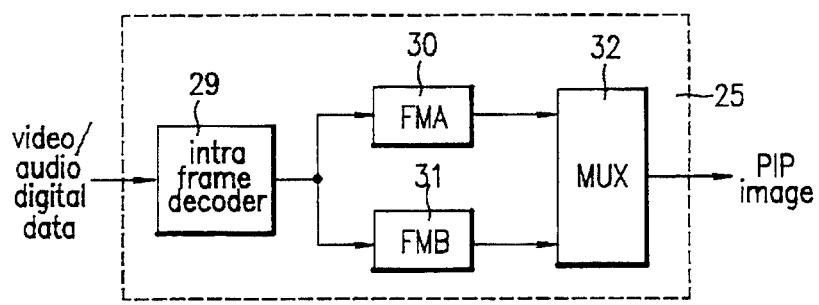

HDTV SYSTEM HAVING PICTURE-IN-PICTURE FUNCTION

BACKGROUND OF THE INVENTION

The present invention relates to a high definition television (HDTV) having a picture-in-picture (PIP) function, and more particularly, to a HDTV system having a PIP function for implementing a PIP image by reconstructing an intraframe image with low resolution.

A general HDTV system will now be described with reference to accompanying drawings.

FIG. 1 is an overall block diagram of a general HDTV system. As shown, the HDTV system includes a tuner & channel decoder 1 for receiving an RF signal transmitted from a broadcasting station and decoding the same in the unit of packets, a depacketizer 2 for receiving and separating a signal generated from tuner & channel decoder 1 into a video bit stream and an audio bit stream to then be output, a video decoder 3 for decoding the video bit stream of the signals generated from depacketizer 2, and a display 4 for outputting the image reconstructed by being decoded in video decoder 3.

The operation of the HDTV system having the aforementioned configuration will now be described.

Tuner & channel decoder 1 having received the RF signal via an antenna decodes the received signal into data of the packet unit to then be output. Depacketizer 2 having received the decoded signal from tuner & channel decoder 1 separates the signal into a video hit stream and an audio bit stream then be output. Video decoder 3 having received the video bit stream generated in depacketizer 2 decodes the video bit stream and reconstruct a video to then be output to display 4.

Here, video decoder 3 of FIG. 1 will be described in more detail with reference to FIG. 2.

FIG. 2 is a detailed block diagram of video decoder 3 in a general HDTV system. As shown, video decoder 3 includes a video buffer 5 for temporarily storing the video bit stream generated in depacketizer 2 shown in FIG. 1, a variable length decoder (VLD) 6 for reading the bit stream stored in video buffer 5 and decoding the signal, an inverse quantizer ($Q^-$) 7 for inversely quantizing the decoded data output from VLD 6, an inverse discrete cosine transform unit (IDCT) 8 for releasing the DCT-compressed signal generated in inverse quantizer 7 and output the difference value from the immediately previous picture in the unit of pixels, an adder 9 for adding the pixel data generated in IDCT 8 with the previous frame data motion-compensated by a motion compensator to be described later, a motion compensator 10 for receiving I and P signals among the outputs of adder 9 and compensating the motion thereof, and a video display processor (VDP) 13 for converting a signal generated in adder 9, i.e., a perfect picture data composed of a luminance signal and a chrominance signal, into R, G and B signals to then be displayed.

Here, motion compensator 10 is composed of a frame memory A (FMA) and a frame memory B (FMB) each for storing a sheet of a perfect picture data immediately prior to compensation.

Referring to FIG. 2, first, input video bit stream is temporarily stored in image buffer 5 and the bit stream is read and decoded in VLD 6, thereby outputting coefficient and motion vector data, respectively.

The output coefficient data becomes pixel data via inverse quantizer 7 and IDCT 8.

Here, the pixel data output from IDCT 8 is the difference value data from the previous picture not from the perfect picture data.

The data is added with the data of the previous frame motion-compensated by motion compensator 10, in adder 9, thereby completing a final perfect picturen data.

The perfect picture is stored in FMA 11 and FMB 12 by each portion of one frame.

Also, the signal of the perfect picture is converted into R, G and B signals which can be displayed on VDP 13 to then be output thereto.

However, in the general HDTV system shown in FIGS. 1 and 2, since two HDTV decoders are required for implementing a PIP image, the circuit becomes complex and the cost is increased accordingly.

SUMMARY OF THE INVENTION

Therefore, it is an object of the present invention to provide a HDTV system having a picture-in-picture (PIP) function for implementing a PIP image with a simplified circuit and at a low cost by reconstructing a decoder for decoding a HDTV image to be displayed on a PIP image screen of the HDTV having the PIP function.

To accomplish the above object, there is provided an HDTV system having a PIP function comprising: a first tuning & channel decoding portion for receiving a video signal for a PIP via an antenna; a first depacketizing portion for receiving a signal generated in the first tuning & channel decoding portion and separating and outputting the same; a second tuning & channel decoding portion for receiving a video signal for a main screen via an antenna; a second depacketizing portion for receiving a signal generated in the second tuning & channel decoding portion and separating and outputting the same; a PIP decoding portion for receiving the video bit stream of the first depacketizing portion to reconstruct only the intraframe into a PIP image; a main video decoding portion for receiving the video bit stream of the second depacketizing means and outputting a main image; a multiplexing portion for multiplexing the outputs of the PIP decoding means and the main image decoding means; and a VDP portion for receiving the output of the multiplexing portion and converting the luminance and chrominance signal into R, G and B signals to then be displayed.

Also, in accordance with another aspect of the present invention, there is provided a HDTV system having a PIP function comprising: a plurality of tuning & channel decoding portions for receiving a video signal for a main screen and a video signal for a PIP via an antenna; a plurality of depacketizing portions for receiving each signal generated in the plurality of tuning & channel decoding portions and separating and outputting the same; a PIP decoding portion for receiving the video bit stream from one of the plurality of depacketizing portions to reconstruct only the intraframe into a PIP image; a main video decoding portion for receiving the video bit stream other than that applied to the plurality of PIP decoding portions and outputting a main video; a multiplexing portion for multiplexing the outputs of the PIP decoding means and the main video decoding means; and display means for displaying the output of the multiplexing portion.

BRIEF DESCRIPTION OF THE DRAWINGS

The above objects and advantages of the present invention will become more apparent by describing in detail a preferred embodiment thereof with reference to the attached drawings in which:

FIG. 4 is a block diagram of a video decoder of a HDTV system having a PIP function according to the present invention;

FIG. 5 is a table of 8×8 IDCT-performed pixels according to the present invention;

FIG. 6 is a block diagram of a PIP decoder according to the present invention;

DETAILED DESCRIPTION OF THE INVENTION

Figure 1:
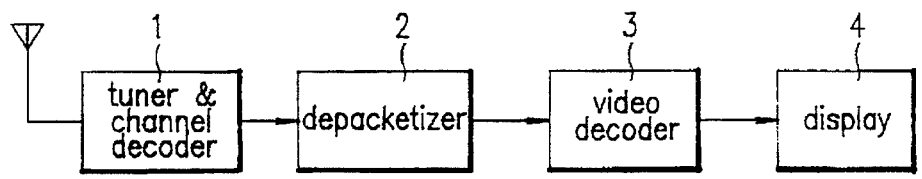
FIG. 1 is an overall block diagram of a general HDTV system.
Figure 2:
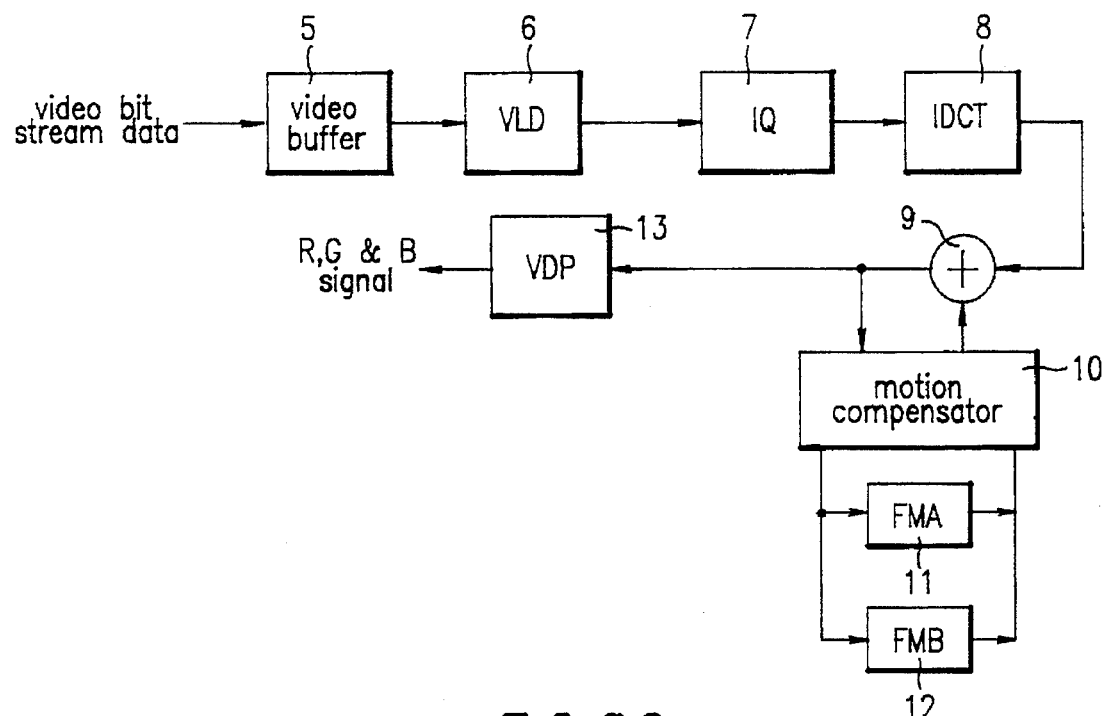
FIG. 2 is a detailed block diagram of a video decoder for the general HDTV system shown in FIG. 1.
Figure 3:
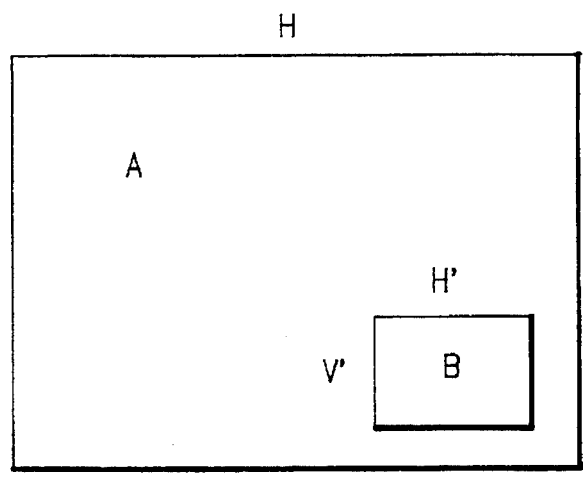
FIG. 3 is a screen diagram of a PIP image.

As shown in FIG. 4, the video decoder of the HDTV system having a PIP function according to the present invention includes a first tuner & channel decoder 21 for receiving a PIP image signal among RF signals transmitted from a broadcasting station to decode the received signal in the unit of packets, a first depacketizer 23 for separating digital data generated in first tuner & channel decoder 21 into audio digital data and video digital data and outputting the same, a PIP decoder 25 for reconstructing only 2×2 data, i.e., intraframe, among the received 8×8 data into a PIP image, a second tuner & channel decoder 22 for receiving a main video signal among RF signals transmitted from a broadcasting station to decode the received signal in the unit of packets, a second depacketizer 24 for separating digital data generated in second tuner & channel decoder 22 into audio digital data and video digital data and outputting the same, a main video decoder 26 for decoding a main video signal, i.e., video bit stream, among the signals generated in second depacketizer 24, a PIP multiplexer (MUX) 27 for multiplexing the signals generated from PIP decoder 25 and main video decoder 26, and a VDP 28 for converting the signal generated in PIP MUX 27 into R, G and B to then be converted into a displayable signal.

The operation of the HDTV system having a PIP function according to the present invention having the aforementioned configuration will now be described in detail.

As shown in FIG. 4, in the HDTV system having a PIP function, first and second tuner & channel decoder for receiving the respective channels to decode data in the unit of packets. First and second depacketizers 23 and 24 separates and output a video bit stream and an audio bit stream, respectively. PIP decoder 25 and main video decoder 26 receive and decodes the video bit stream output from first and second depacketizers 23 and 24 to reconstruct an image.

At this time, PIP decoder 25 reconstructs the image of only the intraframes having low resolution, thereby implementing a far more simple hardware design than that of main video decoder 26.

The respective images reconstructed by PIP decoder 25 and main video decoder 26 are multiplexed in PIP MUX 26 to then be displayed by VDP 28.

Next, FIG. 5 is a table of 8×8 IDCT-performed pixels and explains a low resolution required for PIP decoder 25.

As shown, the data DCT-performed in the unit of blocks and transmitted is IDCT-performed by 8×8 to then obtain a pixel value. Since among 64 data, four sequentially applied coefficients corresponding to the oblique portions are necessary image in PIP in which the image is reconstructed with low resolution, it is enough that only the coefficients of pixels positioned at Nos. 0, 1, 2 and 4 are decoded.

However, the coefficient of the pixel positioned at No. 3 is decoded because the coefficients of applied pixels are 0, 1, 2, 3, 4, 5, 6, . . . 61, 62, 63 in sequence.

Therefore, in PIP image, only four coefficients (0, 1, 2, 4) release the compression by 2×2 IDCT process to then be converted into pixel values.

FIG. 6 is a detailed block diagram of a PIP decoder according to the present invention. The PIP decoder includes an intraframe decoder 29 for taking and decoding 2×2 data among received 8×8. data, frame memory A (FMA) 30 and frame memory B (FMB) 31 for receiving a signal generated in intraframe decoder 29 and storing the previous perfect picture, and a multiplexer (MUX) 32 for multiplexing the signals generated in FMA 30 and FMB 31.

Also, as shown in FIG. 6, the intraframe decoder 29 of PIP decoder 25 selectively decodes only intraframes from the video bit stream generated in first depacketizer 23. FMA (30) and FMB 31 alternately stores an image with low resolution.

At this time, about one fourth the image of the entire screen is sufficient for the capacity of the frame memory, which can be used with small memory capacity.

MUX 32 selectively outputs a PIP image from frame memories FMA 30 and FMB 31.

Figure 7:
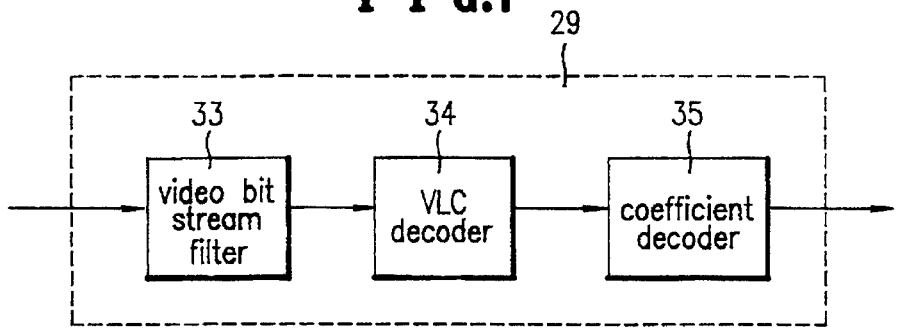
FIG. 7 is a block diagram of an intraframe decoder according to the present invention.

FIG. 7 is a block diagram of the intraframe decoder according to the present invention, which includes a video bit stream filter 33 for outputting only intraframes out of input intraframes and interframes, a variable length coder (VLC) 34 for decoding the intraframes generated in video bit stream filter 33, and a coefficient decoder 35 for receiving a signal generated in VLC decoder 35, obtaining and outputting each four data among input 64 coefficient data.

Video bit stream filter 33 having the aforementioned configuration selectively passes a video bit stream so as to decode intraframes, and VLC decoder 34 decodes only the intraframes.

The codes decoded in VLC decoder 34 are applied to coefficient decoder 35 and only each four codes are taken, among 64 pixel value data of the PIP image, to be reconstructed.

Figure 8:
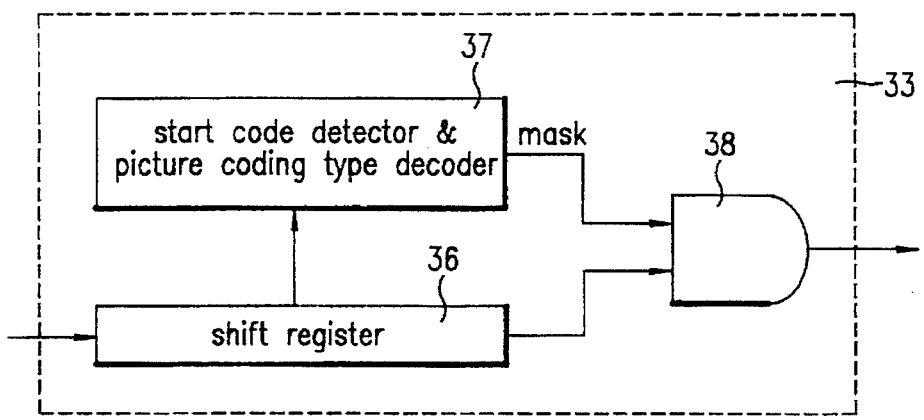
FIG. 8 is a block diagram of a video bit stream filter according to the present invention.

FIG. 8 is a block diagram of the video stream filter according to the present invention, which includes a shift register 36 for converting input video bit stream data into parallel data, a start-code detector & picture-coding-type decoder 37 for receiving data generated in shift register 36, searching for a start code and a picture coding type and outputting a mask signal, and art AND gate 38 for receiving a signal generated by shift register 36 and start-code detector & picture-coding-type decoder 37, performing an AND operation with respect thereto and outputting the video bit stream data of the intraframes only.

In other words, the input video bit stream is converted into parallel data in shift register 36. Start-code detector & picture-coding-type decoder 37 receives the converted parallel data and searches for a start code and a picture coding type to generate a mask signal.

AND gate 38 performs an AND operation with respect to output signals of shift register 36 and start-code detector & picture-coding-type decoder 37 to switch so that only the video bit stream of intraframes is output.

Figure 9:
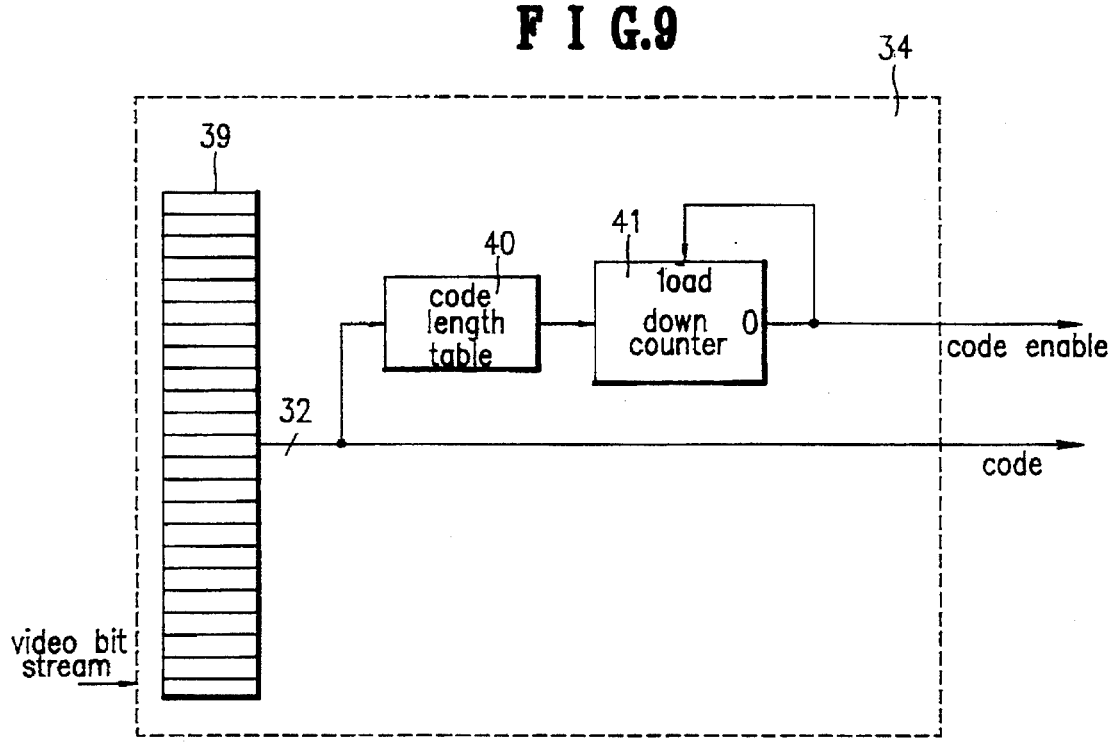
FIG. 9 is a block diagram of a VLC decoder according to the present invention.

FIG. 9 is a block diagram of the VLC decoder according to the present invention.

Referring to FIG. 9, VLC decoder 34 includes a serial-to-parallel shift register 39 for receiving a video bit stream signal (serial data) and parallel-converting and outputting the same, a code-length table 40 for single-coding a signal generated in serial-to-parallel shift register 39 and outputting a coded signal, and a down-counter 41 for receiving a signal generated in code-length table 40 and preparing the coding operation of code-length table 40 if a counted value is 0. The video bit stream of the intraframe output from video bit stream filter 33 is loaded to serial-to-parallel shift register 39. The maximum length of the parallel output code becomes 32 bits. The 32-bit output is coded into a single bit in code-length table 40 to then be loaded to down-counter 41.

If the counted value of down counter 41 is 0, code-length table 40 prepares a coding operation.

For example, if the first, second and third bits of serial-to-parallel shift register 39 are 0, 0 and 1, respectively, code-length table 40 recognizes "1," to output 3 for three bits, which is loaded to down-counter 41 to count 3, 2, 1 and 0. If "0" is counted, a bit including "1" among the fourth, fifth, . . . bits is searched for to then execute a coding operation.

The coding of 32 bits is effective when a code enable signal is maintained. As the clock of serial-to-parallel shift register 39 and code-length table 40, a clock corresponding to the bit rate of the video bit stream is adopted.

Figure 10:
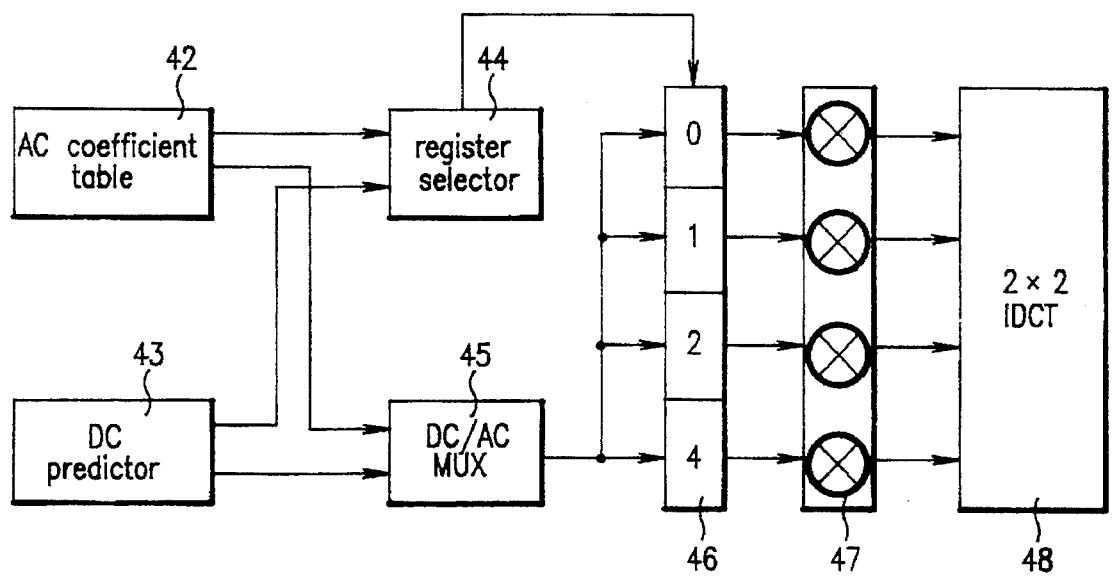
FIG. 10 is a block diagram of a coefficient decoder according to the present invention.

FIG. 10 is a block diagram of the coefficient decoder according to the present invention, which converts only the pixels whose numbers are 0, 1, 2 and 4 into coefficients to finally reconstruct the same into four pixels.

Referring to FIG. 10, the coefficient decoder according to the present invention includes an alternating current (AC) coefficient table 42 for reading, decoding and outputting an input AC value, a direct current (DC) coefficient predictor 43 for decoding an input DC value and obtaining and outputting an original value, a register-selector 44 for receiving a run value and a flag signal and generating an address corresponding to the AC and DC values, DC/AC multiplexer (MUX) 45 for receiving outputs of the AC coefficient table 42 and DC predictor 43 and generating original data, a coefficient register 46 having four 12-bit registers 0, 1, 2 and 4 corresponding to the positions 0, 1, 2 and 4 shown in FIG. 5, for outputting data if four registers are completely filled with values, an inverse quantizer ($Q^{-1}$) 47 for receiving and inverse-quantizing the output of coefficient register 46, and a 2×2 IDCT 48 for receiving a signal generated in inverse quantizer ($Q^{-1}$) 47 and releasing the compression.

To describe the operation of various parts of coefficient decoder in more detail, coefficient 0 has a DC value and coefficients 1, 2 and 4 have AC values. The DC value is decoded in DC predictor 43 and the AC values are decoded in AC coefficient table 42 in run-level pairs.

The output of DC predictor 43 is represented by a decoded DC value and a flag signal generated when the DC value is output. The outputs of AC coefficient table 42 are decoded run-level pairs. The level values are multiplexed with the DC values in DC/AC MUX 45 to be input to coefficient register 46.

Register & selector 44 for applying run values and a flag signal and generating a register address sums the run values to output the summation result as the address, thereby generating addresses of registers 0, 1, 2 and 4 of coefficient register 46.

Coefficient register 46 is constituted by four 12-bit registers 0, 1, 2 and 4, which correspond to the positions 0, 1, 2 and 4 shown in FIG. 5, respectively. If four registers 0, 1, 2 and 4 are all filled with values, the values are multiplied with quantization levels decoded in inverse quantizer ($Q^{-1}$) and then is IDCT-performed in 2×2 IDCT Then, 8-bit data corresponding to four pixels are output from four registers, respectively. Four 8-bit data are input to frame memories 30 and 31 shown in FIG. 6.

Figure 11:
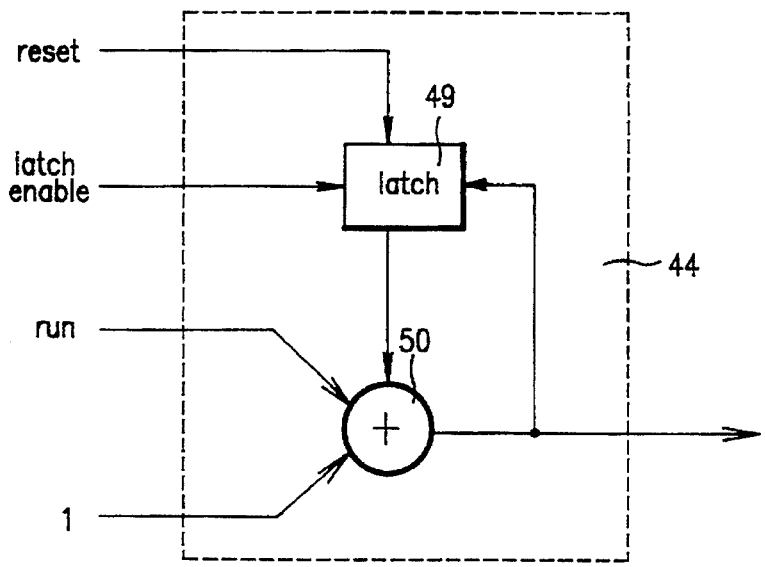
FIG. 11 is a block diagram of a register selector according to the present invention.

FIG. 11 is a block diagram of the register & selector 44 according to the present invention, which includes a latch 49 for storing and outputting summed run values and an adder 50 for adding the output of latch 49 with a run value and outputting the result.

Register & selector 44 receives a reset and a latch enable signal from an input run value and a flag signal.

Latch 49 stores summed run values and adder 50 adds the output of latch 49 with a run and outputs the result. The output value indicates the position of the currently decoded coefficient in the block (8×8 pixels) shown in FIG. 5.

"1" is added to adder 50 because the pixels obtained in a run-level pair numbers run+1.

The register address output from register & selector 44 becomes that of coefficient register 46.

As described above, the HDTV system having a PIP function according to the present invention implements a PIP image by recontructing the image of only intraframes with low resolution, thereby simplifying the circuit owing to the adoption of fewer memories than a main video decoder and reducing the cost accordingly.

What is claimed is:

1. A HDTV system having a PIP function comprising:
   a first tuning & channel decoding portion for receiving a video signal for a PIP via an antenna;
   a first depacketizing portion for receiving a signal generated in said first tuning a channel decoding portion and separating and outputting the same;
   a second tuning & channel decoding portion for receiving a video signal for a main screen via the antenna;
   a second depacketizing portion for receiving a signal generated in said second tuning a channel decoding portion and separating and outputting the same;
   a PIP decoding portion for receiving the video bit stream of said first depacketizing portion to reconstruct an intraframe into a PIP image;
   a main video decoding portion for receiving the video bit stream of said second depacketizing portion and outputting a main image;
   a multiplexing portion for multiplexing the outputs of said PIP decoding portion and said main, video decoding portion; and
   a VDP portion for receiving the output of said multiplexing portion and converting a luminance signal and a chrominance signal into R, G and B signals to then be displayed.

2. The HDTV system of claim 1, wherein said PIP decoding portion includes an intraframe decoder for selecting and decoding only intraframes from the video bit stream and reconstructing the same into the PIP image with low resolution, first and second frame memories for alternately storing said PIP image with low resolution and outputting the same, and a multiplexer for multiplexing said PIP image generated in said first and second frame memories.

3. The HDTV system of claim 2, wherein said intraframe decoder includes a video bit stream filter for filtering the video bit stream so as to decode only intraframes, a VLC decoder for decoding only intraframes of said video bit stream, and a coefficient decoder for restoring said decoded intraframes into the PIP image.

4. The HDTV system of claim 3, wherein said video bit stream filter includes a shift register for converting input video bit stream data into parallel data, a start-code detector a picture-coding-type decoder for receiving said parallel data, searching for a start code and a picture coding type and outputting a mask signal, and an AND gate for performing an AND operation with respect to output signals of said shift register and said start-code detector a picture-coding-type decoder and outputting the video bit stream data of intraframes.

5. The HDTV system of claim 3, wherein said VLC decoder includes a serial-to-parallel shift register for receiving a video bit stream signal of intraframes and parallel-converting and outputting the same in a plurality of bits, a code-length table for single-coding partical bits among said plurality of bits, and a down-counter for receiving the single-code of said partial bits, down-counting to 0 and preparing the next coding operation.

6. The HDTV system of claim 3, wherein said coefficient decoder includes a DC predictor for receiving coefficients having a DC value among coefficients for the PIP image and outputting a decoded DC value and a flag signal, an AC coefficient table for receiving coefficients having an AC value among coefficients for the PIP image and outputting a decoded run-level pair, a third multiplexer for receiving and multiplexing said decoded DC value and level value, a register and selector or receiving decoded run values and flag signal, summing said run values and outputting a register address, an inverse quantizer for multiplying quantized levels decoded in said register and selector, and an inverse DCT for receiving the output signal of said inverse quantizer and outputting as data for the PIP image.

7. The HDTV system of claim 6, wherein said register and selector includes a latch to receive a reset and a latch enable signal from an input run value and the flag signal and stores the summed run values, and an adder to add output of said latch with the run value and adds 1 and outputs value to indicate position of a decoded PIP coefficient.

8. A HDTV system having a PIP function, comprising:

a plurality of tuning & channel decoding portions for receiving a video signal for a main screen and a video signal for a PIP via an antenna;

a plurality of depacketizing portions for receiving each signal generated in said plurality of tuning & channel decoding portions and separating and outputting the same;

a PIP decoding portion for receiving a video bit stream from one of said plurality of depacketizing portions to reconstruct only an intraframe into a PIP image;

a main video decoding portion for receiving the video bit stream other than that applied to a plurality of PIP decoding portions and outputting a main video;

a multiplexing portion for multiplexing the outputs of said PIP decoding portion and said main video decoding portion; and display means for displaying the output of said multiplexing portion.

* * * * *